Aug. 3, 1948.  C. W. CRUMRINE  2,446,265
PHOTOGRAPHIC SHUTTER
Filed July 22, 1946
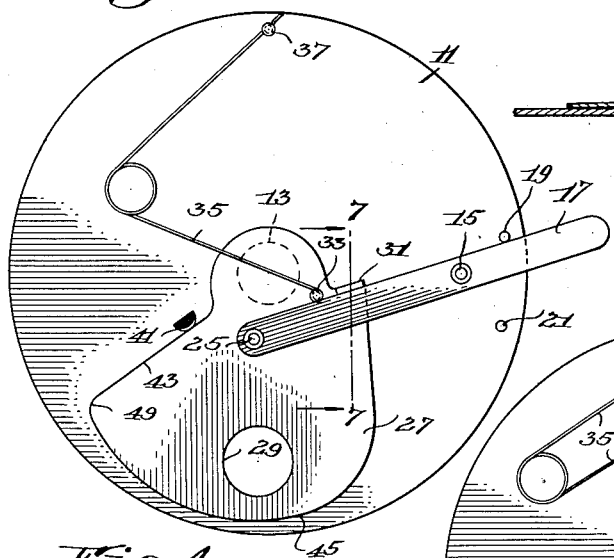
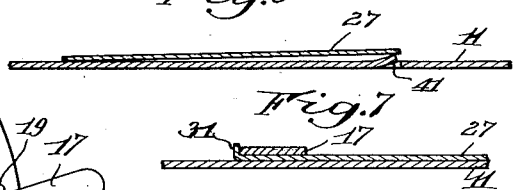
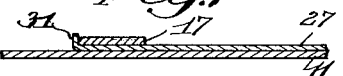
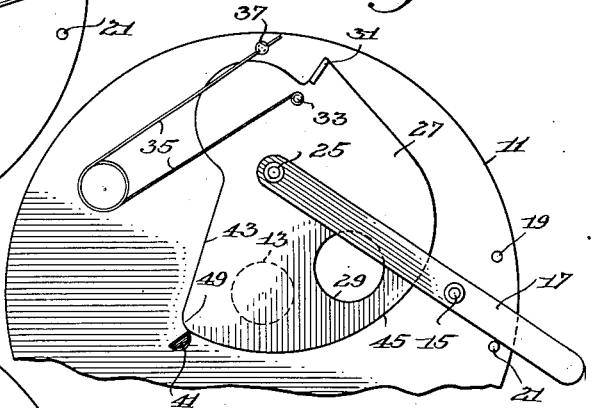
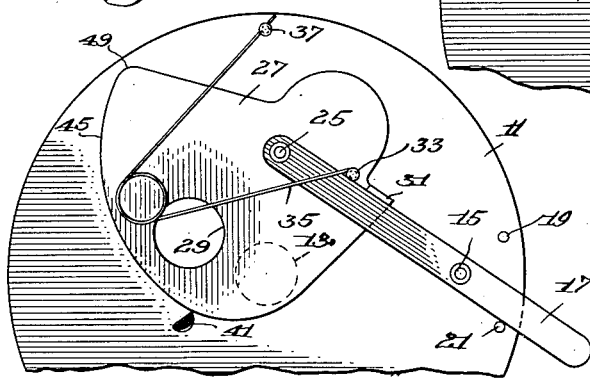
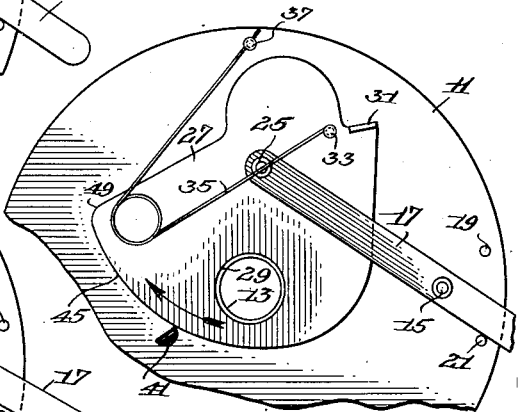
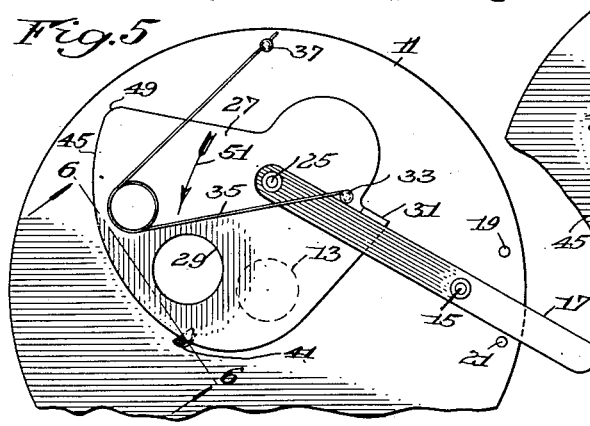
INVENTOR.
Chester W. Crumrine
BY Charles Shepard
his Attorney Patented Aug. 3, 1948

2,446,265

UNITED STATES PATENT OFFICE 2,446,265

PHOTOGRAPHIC SHUTTER

Chester W. Crumrine, Irondequoit, N. Y., assignor to Kryptar Corporation, a corporation of New York Application July 22, 1946, Serial No. 685,407

9 Claims. (Cl. 95—59)

This invention relates to a photographic shutter and has for its principal object the provision of an improved and simplified shutter intended for inexpensive cameras, having greater reliability and accuracy than the shutters previously used on such cameras.

Another object is the provision of a shutter so designed and constructed that it may be easily and economically manufactured and assembled by mass production methods.

Still another object is the provision of a shutter so designed and constructed that it is substantially "foolproof" in operation, at the hands of an inexperienced user.

These and other desirable objects are accomplished by the construction disclosed as an illustrative embodiment of the invention in the following description and in the accompanying drawings forming a part hereof, in which:

Fig. 1 is a front elevation of a shutter in accordance with a preferred embodiment of the invention, with the parts in normal rest position, the shutter being closed;

Fig. 2 is a similar view with the parts in a different position, the shutter being tensioned and about to make an exposure;

Fig. 3 is a similar view with the shutter fully open, in the position assumed at the middle of the exposure;

Fig. 4 is a similar view of the shutter closed again, immediately following the exposure;

Fig. 5 is a similar view of the parts in the position assumed an instant after Fig. 4, the shutter beginning to return to its normal rest position;

Fig. 6 is a cross section taken substantially on the line 6—6 of Fig. 5; and

Fig. 7 is a cross section taken substantially on the line 7—7 of Fig. 1.

The same reference numerals throughout the several views indicate the same parts.

As will be obvious to those skilled in the art, the shutter herein specifically disclosed as an example of the invention is a shutter of simple and inexpensive type, suitable for use on relatively inexpensive cameras, and is capable of producing only "instantaneous" exposures, there being no provision for "bulb" or "time" exposures. However, many of the principles of the present invention may be employed in the construction of shutters of higher grade, suitable for use on more expensive cameras.

In many of the inexpensive shutters heretofore used, there has been an operating lever capable of oscillating back and forth between two extreme positions, movement in one direction producing one exposure and movement in the opposite direction also producing an exposure. This type of shutter has frequently been improperly operated by inexperienced persons, who mistakenly believe that having moved the lever in one direction, they must move it back to its initial position before the picture taking operation is finished. This results, of course, in a double exposure. This possibility is obviated by the shutter of the present invention, for the operating lever moves only in one direction to make the exposure, and when it moves back in the opposite direction to its initial position no exposure is made. This backward movement to initial position may be accomplished by the finger of the operator if desired, or is accomplished automatically by a spring if the operator fails to move the lever back.

Referring now to the drawings, there is shown a main base plate or mounting plate 11 having a central aperture 13 which constitutes the shutter aperture, as understood by those skilled in the art. Pivoted at 15 to the base plate 11 is the operating lever 17 movable back and forth on its pivot between two extreme positions determined by the abutments 19 and 21, preferably in the form of stop pins secured to the plate 11. One end of the lever 17 projects laterally beyond the edge of the mounting plate 11 to an accessible position for actuation by the finger or thumb of the user.

On the inner end of the operating lever 17 there is pivoted at 25 a shutter blade 27. It is to be noted particularly that this blade 27 is not pivoted to any other part except the operating lever 17, and is free to move or "float" in any direction over the front surface of the plate 11, except as restrained by the pivot 25 or by various stops and abutments described below. This shutter blade 27 has an aperture or opening 29 in its lower part when viewed as in Fig. 1, which opening is of about the same diameter as or a little larger than the aperture 13 in the plate 11, and which is adapted to be momentarily alined with the aperture 13 during the making of an exposure. At all other times, the shutter blade 27 covers the aperture 13.

At one edge of the shutter blade there is an upstanding ear or lug 31 (see Fig. 7) which engages one edge of the lever 17 to determine the maximum extent to which the shutter blade can swing in a clockwise direction on its pivot 27.

The shutter blade also carries an upstanding stud 33 to which is secured one end of a generally U-shaped or hairpin shaped spring 35, the other end of which is secured to a stationary stud 37 on the front part of the base plate 11. The two legs of this spring 35 constantly tend to move away from each other, thus tending at all times to shift the stud 33 on the shutter blade in a direction away from the stud 37 on the base plate.

Also on the base plate, offset a little below and to the left of the aperture 13, is an inclined lug 41, preferably formed by embossing upwardly a small portion of the base plate, as seen in Fig. 6, so that the lug presents an approximately vertical sharp edge in one direction, and an inclined cam surface in the opposite direction. The shutter blade is provided with a straight edge 43 for cooperation under certain circumstances with this lug 41, and is also provided with a curved edge 45 which is substantially on an arc concentric with the pivot 25.

The operation of the shutter is as follows: The closed position or normal position of the shutter is as shown in Fig. 1. To actuate the shutter to make an exposure, the operator presses down on the outer projecting end of the operating lever 17. This raises the inner end of the lever, and carries the pivot 25 upwardly from the position shown in Fig. 1 toward the position shown in Fig. 2, during which upward movement the straight edge 43 of the shutter meanwhile rides along the lug or abutment 41 in engagement therewith. During this upward movement, the spring 35 is being compressed or tensioned and is constantly tending to swing the shutter blade in a clockwise direction about its pivot 25, but is unable to do so because of the engagement of the blade with the lug or abutment 41.

During this upward movement the shutter blade completely covers and closes the aperture 13, so that no exposure is made. Just as the lever 17 reaches the extreme limit of its movement, the lower corner 49 of the shutter blade (that is, the corner between the straight edge 43 and the arcuate edge 45) reaches the lug or abutment 41 and passes slightly beyond it, as shown in Fig. 2. Because the shutter is no longer restrained by the lug 41, the spring 35 can now act to turn the shutter blade in a clockwise direction about the pivot 25, and the blade rapidly swings from the position shown in Fig. 2 past the position shown in Fig. 3 to the extreme position shown in Fig. 4, where it comes to rest by engagement of the ear 31 on the shutter with the edge of the lever 17. As it swings from the position of Fig. 2 to the position of Fig. 4, it momentarily passes through the position shown in Fig. 3, wherein the aperture 29 in the shutter is alined with the aperture 31 in the base plate 11, thus producing a so-called "instantaneous" exposure.

As soon as the operator hears the slight sound or "click" produced by the lug 31 hitting against the lever 17, he knows that the exposure is complete and he may now remove his finger from the lever 17. The spring 35 then moves the shutter blade and the operating lever together in a downward direction as indicated by the arrow 51 in Fig. 5, from the position of Fig. 4 through the position shown in Fig. 5 back to the initial position shown in Fig. 1. This movement is possible because the arcuate edge 45 of the shutter blade is now above the lug 41 or on the inclined cam side thereof and can readily ride over the lug as indicated in Figs. 5 and 6, instead of being held or restrained by the lug. During the movement of the parts back from the positions shown in Figs. 4 and 5 to the rest position shown in Fig. 1, no further swinging movement of the shutter blade relative to the lever 17 can take place, because the lug 31 on the shutter blade is already engaged with the side of the lever. However, the shutter blade and the lever itself both swing bodily together, to the lower position shown in Fig. 1, and during this swinging movement the shutter blade at all times covers and closes the aperture 13, so that no exposure is made during this part of the cycle of operation. Just as the shutter blade reaches the extreme lower limit of its return motion, the straight edge 43 thereof snaps over the upstanding edge of the lug or abutment 41, and the cycle of operation is now complete, ready for the making of the next exposure.

It will be understood that the operating lever 17 is usually made of sheet metal, and the shutter blade 27 may be of sheet metal, ebonite, plastic material, or other suitable construction. The pivot 15 of the operating lever 17 is sufficiently firm so that the operating lever is held relatively tight against the front face of the shutter blade and the shutter blade itself is held relatively tight against the front face of the plate 11, but the parts have sufficient resiliency to permit the shutter blade to rise slightly away from the front face of the plate 11 when it slides over the lug or abutment 41 as indicated in Figs. 5 and 6.

It is seen from the foregoing disclosure that the above-mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising a member having an aperture therein, a lever pivotally mounted for oscillating movement near said member, a shutter blade pivotally mounted on said lever for bodily movement therewith and also for swinging movement relative to said lever, said blade having an opening spaced from the pivot of said blade which will be alined with said aperture when said blade swings while said lever is in one position, said blade being adapted to overlie and close said aperture when said lever is in substantially different positions, and means for swinging said blade in one direction about its pivot while said lever is in said one position and for swinging said blade in a reverse direction about its pivot while said lever is in a substantially different position.

2. A photographic shutter comprising a member having an aperture therein, a lever pivotally mounted for oscillating movement near said member, a shutter blade pivotally mounted on said lever for bodily movement therewith and also for swinging movement relative to said lever, means for swinging said blade in one direction about its pivot as said blade moves bodily with said lever during oscillation of said lever in one direction, means for swinging said blade in the opposite direction about its pivot when said lever reaches a predetermined position during said oscillation in one direction, and an opening in said blade for momentary alinement with said aperture in said member as said blade swings in said opposite direction, said blade serving to overlie and close said aperture at other times.

3. A construction as described in claim 2, in which said means for swinging said blade in one direction includes cooperating surfaces on said member and said blade.

4. A construction as described in claim 2, in which said means for swinging said blade in one direction includes a shoulder on said member and a cam surface on said blade for engagement with said shoulder.

5. A construction as described in claim 2, in which said means for swinging said blade in the opposite direction includes a spring.

6. A photographic shutter comprising a plate having an aperture therein, a member mounted for movement relative to said plate, a shutter blade pivotally mounted on said member to swing relative to said member and also capable of bodily movement with said member, spring means tending to turn said blade in one direction relative to said member, means for swinging said blade in the opposite direction relative to said member and thus tensioning said spring means when said member moves in one direction relative to said plate, and for releasing said blade when said member reaches a predetermined position so that said spring means may swing said blade in said first mentioned direction, and an opening in said blade in position to be momentarily alined with said aperture in said plate while said blade swings in said first mentioned direction, said blade otherwise serving to cover and close said aperture.

7. A photographic shutter comprising a plate having an aperture therein, a member mounted for movement relative to said plate, a shutter blade pivotally mounted on said member to swing relative to said member and also capable of bodily movement with said member, spring means tending to turn said blade in one direction relative to said member, an abutment on said plate and a cooperating edge on said blade for swinging said blade in the opposite direction relative to said member when said blade moves bodily upon movement of said member in one direction, said edge passing beyond and being released from said abutment when said blade reaches a predetermined position so that said spring means may swing said blade in said first mentioned direction relative to said member, said blade momentarily uncovering said aperture to produce an exposure during such swinging movement of said blade in said first mentioned direction, and serving to cover said aperture at other times.

8. A construction as described in claim 7, in which said abutment has an abrupt edge in a direction facing said edge of said blade, and is sloped gently in the opposite direction so that said blade may ride over said abutment when coming into contact therewith from the opposite direction.

9. A photographic shutter comprising a plate having an aperture therein, a lever pivotally mounted on said plate for oscillation between two extreme positions, a shutter blade pivotally mounted on said lever for swinging movement relative thereto between two extreme positions and also capable of bodily movement with said lever when said lever is oscillated, spring means constantly tending to swing said blade to the first of its extreme postions and to hold said lever in the first of its extreme positions, said shutter blade serving to overlie and close said aperture whenever said shutter blade is in either of its extreme positions and having an opening for alinement with said aperture to make an exposure when said blade is at an intermediate position while said lever is in the second of its extreme positions, and cooperating parts on said plate and said blade for swinging said blade to the second of its extreme positions as said lever moves from the first toward the second of its extreme positions and for releasing said blade when said lever substantially reaches its second extreme position so that said blade may swing toward its first extreme position and thereby produce an exposure.

CHESTER W. CRUMRINE.

REFERENCES CITED

The following references are of record in the file of this patent:

UNITED STATES PATENTS

| Number  | Name      | Date          |
|---------|-----------|---------------|
| 462,335 | Spaulding | Nov. 3, 1891  |
| 831,202 | Wollensak | Sept. 18, 1906|